US007834582B2

(12) United States Patent
Luan et al.

(10) Patent No.: US 7,834,582 B2
(45) Date of Patent: Nov. 16, 2010

(54) METHOD AND APPARATUS FOR CONTROLLING VEHICLE BATTERY CHARGING

(75) Inventors: Yunfei Luan, Rochester Hills, MI (US); Damon R. Frisch, Troy, MI (US); Chihsiung Lo, West Bloomfield, MI (US); Goro Tamai, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1224 days.

(21) Appl. No.: 11/432,456

(22) Filed: May 11, 2006

(65) Prior Publication Data

US 2007/0262749 A1 Nov. 15, 2007

(51) Int. Cl.
 *H01M 10/44* (2006.01)
 *H01M 10/46* (2006.01)
(52) U.S. Cl. ..................................................... 320/104
(58) Field of Classification Search .................. 320/104, 320/132, 149; 701/22; 180/65.1, 65.21; 903/904, 905, 907
See application file for complete search history.

(56) References Cited

U.S. PATENT DOCUMENTS

| | | | | |
|---|---|---|---|---|
| 5,898,282 A * | 4/1999 | Drozdz et al. | ............... | 318/139 |
| 5,959,420 A * | 9/1999 | Boberg et al. | ............... | 318/432 |
| 6,331,762 B1 * | 12/2001 | Bertness | ..................... | 320/134 |
| 6,359,419 B1 | 3/2002 | Verbrugge et al. | | |
| 6,583,599 B1 | 6/2003 | Phillips et al. | | |
| 6,639,385 B2 | 10/2003 | Verbrugge et al. | | |
| 6,687,581 B2 | 2/2004 | Deguchi et al. | | |
| 2002/0196027 A1 | 12/2002 | Tate, Jr. et al. | | |
| 2005/0057255 A1 | 3/2005 | Tate, Jr. et al. | | |
| 2005/0088139 A1 | 4/2005 | Frank | | |

\* cited by examiner

*Primary Examiner*—Edward Tso

(57) ABSTRACT

An electrical charging strategy and system for a high voltage electrical energy storage system able to supply electrical energy to a hybrid vehicle is disclosed. The system charges the electrical energy storage system so state-of-charge at the end of a trip is substantially unchanged. The strategy and system employs opportunity charging to achieve maximum energy efficiency of the hybrid system, thus minimizing fuel consumption and maximizing fuel economy. The charging system operation is controlled, based upon: the state-of-charge of the electrical energy storage system, and, the operating efficiency of the internal combustion engine. Battery life is likewise extended through use of this strategy.

19 Claims, 2 Drawing Sheets

METHOD AND APPARATUS FOR CONTROLLING VEHICLE BATTERY CHARGING

TECHNICAL FIELD

This invention pertains generally to hybrid vehicle propulsion systems, and more specifically to systems for controlling electrical charging of electrical energy storage systems for hybrid vehicle propulsion systems.

BACKGROUND OF THE INVENTION

A vehicle equipped with a hybrid propulsion system, i.e. a vehicle integrating an electrical motor and an internal combustion engine, typically operates by selectively employing the electrical motor and the internal combustion engine in the driveline to propel the vehicle. One such hybrid propulsion system, referred to as vehicle stop/start system, comprises a system which turns off the internal combustion engine during vehicle idle/stop, and enables early fuel cutoff to the engine during decelerations. When an operator subsequently tips into the throttle to accelerate the vehicle, a control system causes the electric motor to crank the internal combustion engine if engine speed is below a certain threshold, using electrical energy stored in a high-voltage battery. This operation is intended to provide improved fuel economy in stop-and-go driving. The high-voltage battery requires recharging to replenish the stored electrical energy consumed by the electric motor.

One exemplary hybrid system designed to achieve vehicle stop/start operation comprises a belt alternator starter (BAS) system. The hybrid system combines sophisticated engine controls with a precision electric motor/generator. Regenerative braking and efficient electrical charging are included in such a system. A single, 36-volt battery provides electrical power, augmenting the existing 12-volt electrical system. All vehicle accessories and passenger comfort systems, such as air conditioning, function even during the periods when the engine is automatically stopped. The BAS system may be employed on four and six-cylinder engines with minimal effect on engine and transmission architectures.

It is well understood that maintaining state of charge ('SOC') of the electrical energy storage system, e.g., the high-voltage battery, is important. Over-depletion of battery SOC typically decreases battery life, whereas overcharging of the battery unnecessarily expends fuel, thus decreasing effective fuel economy of the vehicle.

Prior efforts to control battery charging include zero-current charging, or 'trickle charging', wherein there is continual charging of the battery at near zero current. At light motor-generator unit (MGU) loads, the battery charging unit is not operating at optimal efficiency, thus needlessly expending energy. Furthermore, opportunities to more completely charge the battery are missed at higher engine efficiencies, due to current-limiting characteristics of the zero-current system.

It is important to optimize battery charging, to maximize battery life and maximize vehicle fuel economy in a hybrid electric vehicle. The disclosed invention provides optimized battery charging that addresses the concerns mentioned above.

SUMMARY OF THE INVENTION

What is disclosed is an electrical charging strategy and system for a high voltage electrical energy storage system able to supply electrical energy to a hybrid vehicle. The electrical charging strategy and system charges the electrical energy storage system to ensure that a state-of-charge of the electrical energy storage system at the end of a trip or driving cycle is substantially the same as the state-of-charge at the beginning of the trip. The electrical charging strategy and system preferably employs opportunity charging to achieve maximum energy efficiency of the hybrid system, thus minimizing fuel consumption and maximizing fuel economy.

In accordance with the present invention, a method and control system for a charging system is offered which is operable to supply electrical energy for storage in an electrical energy storage system of a vehicle having a hybrid propulsion system which includes an internal combustion engine. The internal combustion engine is operable to provide propulsion torque to a driveline of the vehicle, and operable to provide charging torque to the charging system. The control system is operable to determine a state-of-charge of the electrical energy storage system, and determine operating efficiency of the internal combustion engine. The charging system operation is controlled, based upon: the state-of-charge of the electrical energy storage system, and, the operating efficiency of the internal combustion engine.

The invention further comprises the control system operable to determine speed of the vehicle; and, control operation of the charging system, based upon: the state-of-charge of the electrical energy storage system, the operating efficiency of the internal combustion engine, and, the speed of the vehicle.

The invention further comprises the control system operable determine an operating point of the internal combustion engine; and, control operation of the electrical charging system, based upon: the state-of-charge of the electrical energy storage system, the operating efficiency of the internal combustion engine, and, the engine operating point.

Another aspect of the invention comprises the control system operable to selectively operate the electrical charging system when a change in the operating efficiency due to operation of the electrical charging system exceeds a predetermined value.

Another aspect of the invention comprises the control system operable to increase range of engine operation at which the electrical charging system operates based upon a decrease in the state-of-charge.

Another aspect of the invention comprises the control system operable to limit range of engine operation at which the electrical charging system operates based upon an increase in the state-of-charge.

Another aspect of the invention comprises the control system operable to discontinue operation of the electrical charging system when the state-of-charge exceeds a maximum value.

Another aspect of the invention comprises the electrical charging system comprises a high voltage electrical energy charging system.

Another aspect of the invention comprises the control system operable to maintain the state-of-charge of the electrical energy storage system between a minimum value and a maximum value.

Another aspect of the invention comprises the control system operable to determine a specific fuel consumption of the engine.

Another aspect of the invention comprises a method to optimize life of an electrical energy storage system, based upon the foregoing.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
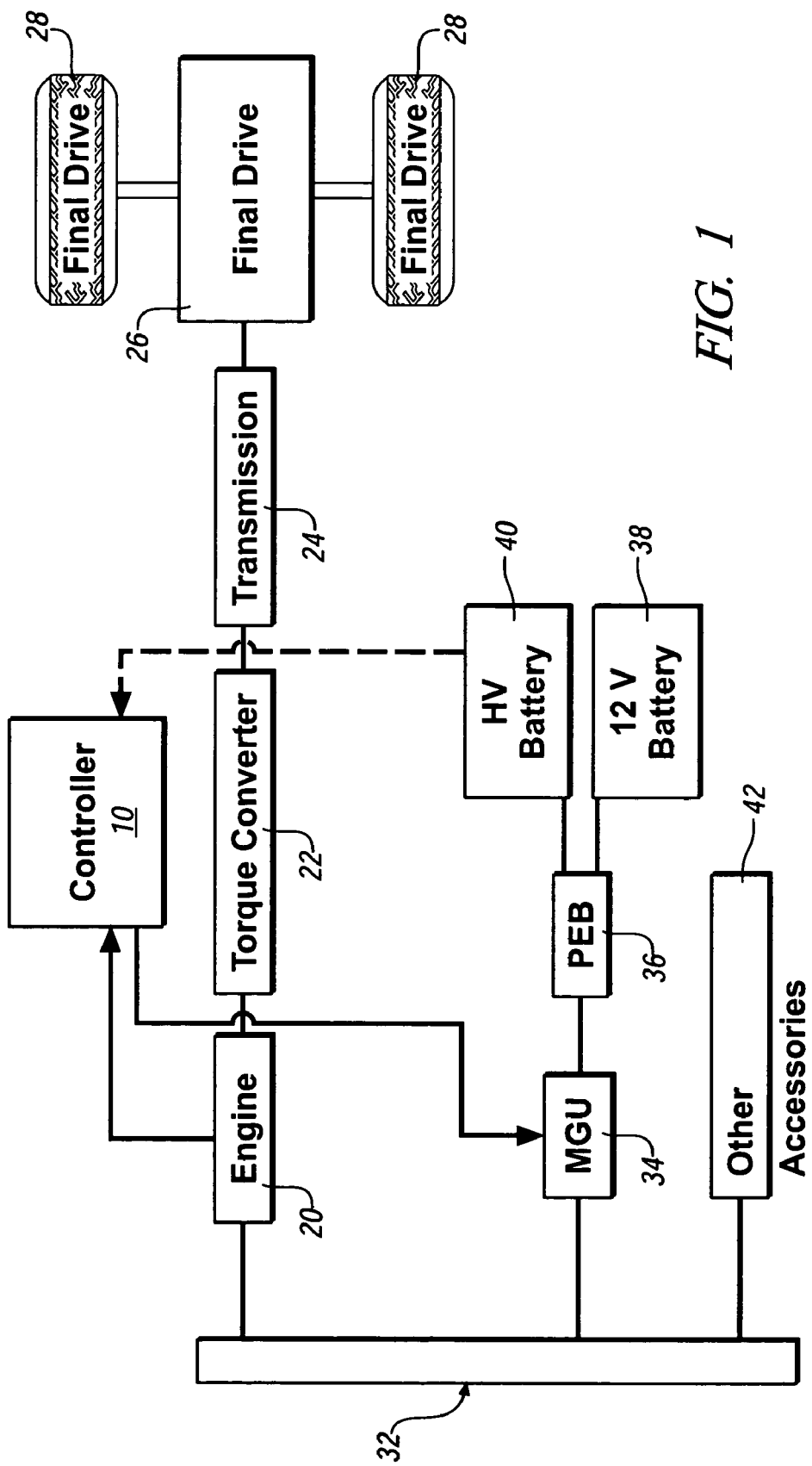
FIG. 1 is a schematic diagram of an exemplary propulsion system, in accordance with the present invention.

Referring now to the drawings, wherein the showings are for the purpose of illustrating the invention only and not for the purpose of limiting the same, FIG. 1 shows a schematic drawing of a vehicle propulsion system including an exemplary internal combustion engine and control system which has been constructed in accordance with an embodiment of the present invention. The exemplary system, described as a belt-driven alternator/starter ('BAS') system, comprises a powertrain system having internal combustion engine 20, a motor-generator unit 34, and a powertrain controller 10.

The powertrain system includes internal combustion engine 20, which provides motive power to drive wheels 28 using known power transmission devices including a torque converter 22, a transmission 24, and a final drive device 26, typically comprising a transaxle for a front wheel drive vehicle, or, alternatively, a rear differential unit for a rear wheel drive vehicle, or other known devices for delivering power to vehicle wheels.

The internal combustion engine 20 is operably attached to an accessory belt drive system 32. In one operating condition, the internal combustion engine 20 powers the accessory belt drive system 32, transferring power and energy to a motor-generator unit 34 ('MGU') and other accessories. In a second operating condition, the MGU 34 is operable to spin the internal combustion engine 20 to start engine operation. The MGU 34 is operable to replenish or charge an electrical energy storage system comprising a high-voltage ('HV') battery 40 and a second, conventional twelve-volt battery 38, via a Power Electronics Box ('PEB') 36. The PEB 36 includes the functions of a Power Inverter Module (PIM) and Auxiliary Power Module (APM) to selectively provide electrical energy to the high-voltage ('HV') battery 40 and the conventional twelve-volt battery 38. The aforementioned componentry of the exemplary embodiment is known to a skilled practitioner, although it is understood that alternate embodiments using novel componentry may fall within the scope of the invention described herein.

The powertrain controller 10 is preferably an element of an integrated vehicle control system comprising a distributed control system wherein a plurality of controllers are signally connected via a local area network ('LAN') throughout the vehicle to accomplish various tasks. The exemplary integrated vehicle control system includes powertrain controller 10 which is signally and operably connected to the internal combustion engine 20, a transmission controller (not shown), and an electrical power controller (not shown) operably connected to the PEB 36. Each of the aforementioned controllers is preferably a general-purpose digital computer generally including a microprocessor or central processing unit, ROM, RAM, and I/O including A/D and D/A. Each controller has a set of control algorithms, comprising resident program instructions and calibrations stored in ROM and executed to provide the respective functions of each computer. Information transfer between the various computers is preferably accomplished by way of the aforementioned LAN.

The integrated vehicle control system is signally attached to a plurality of sensing devices and operably connected to a plurality of output devices to ongoingly monitor and control operation of the engine 20, the transmission 24, and the MGU 34. This includes monitoring conditions of the HV battery 40, and, determining state of charge of the HV battery 40. The controlled output devices preferably include subsystems necessary for proper control and operation of the engine 20, including, by way of example, an air intake system, a fuel injection system, a spark-ignition system (when a spark-ignition engine is used), an exhaust gas recirculation system, and an evaporative control system. The engine sensing devices include devices operable to monitor engine operation, including engine speed, and load, comprising manifold pressure and/or airflow. The powertrain controller 10 is preferably operable to regularly determine an engine operating point, in terms of brake-mean effective pressure, ('BMEP', in kPa), and a brake-specific fuel consumption ('BSFC', in g/MJ) based upon the monitored engine operation, each of which are useable as described hereinafter. Other engine sensors comprise sensors operable to monitor external conditions, and operator demand, and are typically signally attached to the controller via wiring harnesses.

Control algorithms in each of the controllers are typically executed during preset loop cycles such that each control algorithm is executed at least once each loop cycle. Algorithms stored in the non-volatile memory devices are executed by the central processing unit and are operable to monitor inputs from the sensing devices and execute control and diagnostic routines to control operation of the respective device, using preset calibrations. Loop cycles are typically executed each 3, 6.25, 15, 25 and 100 milliseconds during engine operation. Alternatively, control algorithms may be executed in response to occurrence of an event. A cyclical event, e.g. calculation of engine fueling, may be executed each engine cycle. An action to start the engine 20 after it is turned off is preferably executed in response to an event, e.g. an operator demand for acceleration. Alternatively, the action to start the engine 20 after it is turned off may be a quasi-cyclic event, wherein the powertrain controller 10 cyclically monitors vehicle conditions such ambient air temperature, and implements an engine start event on a subsequent loop cycle in order to provide additional functionality.

The integrated vehicle control system is signally connected to the aforementioned sensors and other sensing devices, and operably connected to output devices to monitor and control engine and vehicle operation. The output devices preferably include subsystems necessary for proper control and operation of the vehicle, including the engine, transmission, and brakes. The sensing devices providing signal input to the vehicle include devices operable to monitor vehicle operation, external and ambient conditions, and operator commands.

One such algorithm executed by the controller comprises calculating battery state of charge ('SOC') for the electrical energy storage system, i.e., the high voltage battery 40 of this embodiment which is a 36-volt battery. Battery voltage, current, and temperature are monitored individually. Various vehicle operations that consume electrical energy, and, charge the battery with electrical energy, are monitored. The SOC algorithm is able to ongoingly estimate or determine battery SOC, using any one of numerous methods to determine battery SOC based upon the foregoing, which are known to a skilled practitioner.

Figure 2:
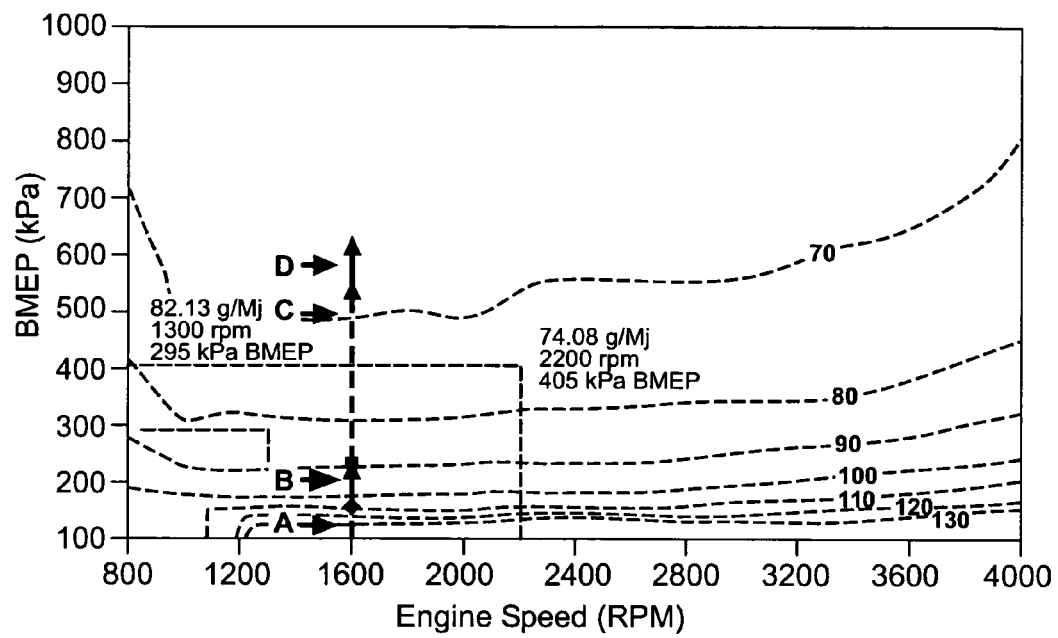
FIG. 2 is a graphical representation of engine operation, in accordance with the present invention; and, FIG. 3 is a graphical representation of system calibration, in accordance with the present invention.

Referring now to FIG. 2, a graph of engine operating points, in terms of speed and engine load, calculated in the form of BMEP (kPa) for an exemplary engine, and showing lines of constant brake-specific fuel consumption ('BSFC') is shown. The exemplary engine is a known, modern four-cylinder internal combustion, spark ignition engine having a displacement of 2.4 liters, with data obtained through testing on an engine dynamometer. Referring now to Points A and B of FIG. 2, Point A represents the engine operating at 1600 revolutions per minute ('RPM') and at BMEP of 158.1 kPa, and is a baseline measurement comprising an engine operating point with no electrical charging. Point B represents the same engine speed of 1600 RPM, with electrical charging. In this example, as compared to operating point A, engine operating point B increases to BMEP of 237.1 kPa (an increase of 81 kPa), and the corresponding BSFC is reduced by 17.4 g/MJ, an improvement of 16.9%. Referring now to points C and D of FIG. 2, Point C represents the engine operating at 1600 revolutions per minute ('RPM') and at BMEP of 534.5 kPa, and is a second measurement of an engine operating point with no electrical charging, with the engine operating at a high load. Point D represents the same engine speed of 1600 RPM, with electrical charging load added to the high load. In this example, as compared to operating point C, engine load increases at operating point D by 79 kPa, to a BMEP of 615.4 kPa, and the corresponding BSFC is reduced by 1.6 g/MJ, an improvement of only 2.3%. This demonstrates that additional improvements in engine efficiency are difficult to achieve when the engine is in a high load/high efficiency zone, due to greater heat losses, more fuel mass losses caused by cylinder blow-by, higher mechanical friction, and possibility of operating in power enrichment modes, under some circumstances. However, additional improvements in engine efficiency are readily attained when the engine is operating in a low load zone.

Figure 3:
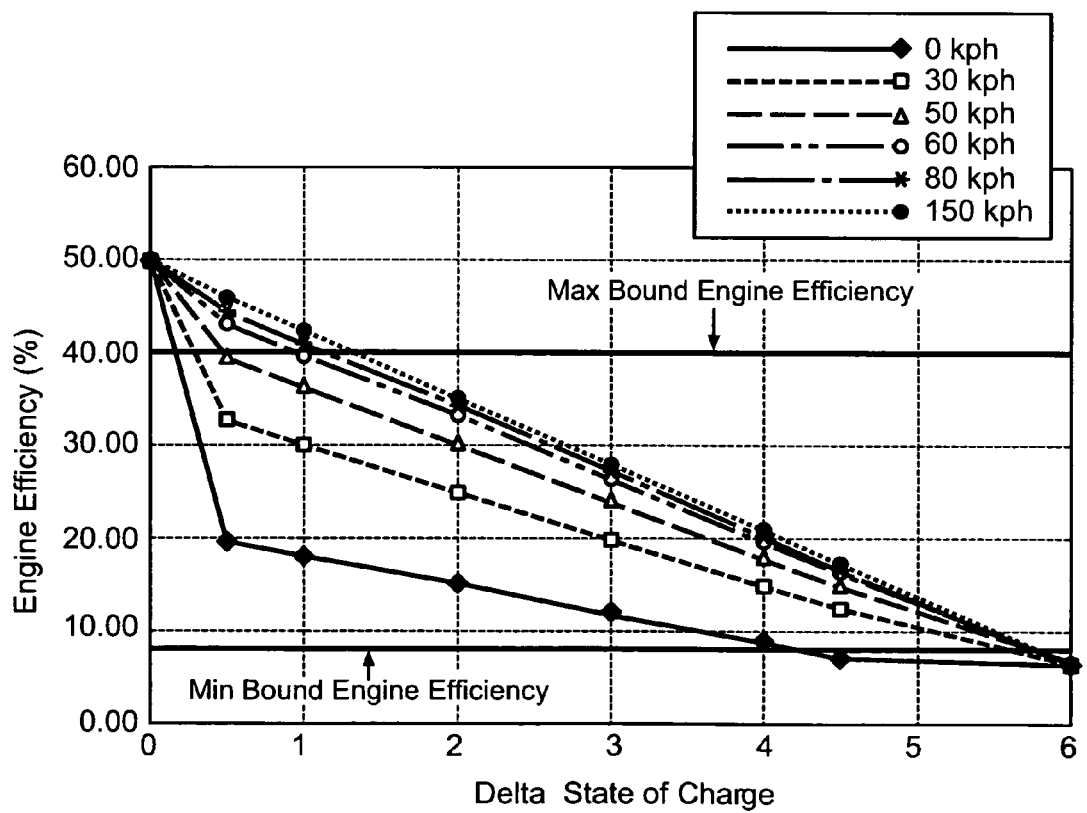

Referring now to FIG. 3, a data graph representative of a calibration for a charging control strategy is shown. The x-axis includes values for Delta-SOC, which comprises a difference between the actual SOC of the HV battery 40 and a minimum allowable SOC. In this example, the minimum allowable SOC is 70%. Therefore, each value on the x-axis is equal to the Delta-SOC plus 70%. The y-axis includes values for normalized engine efficiency, in percent (%). In normalized engine efficiency, as BSFC increases, engine efficiency decreases. Each plotted line on the graph indicates the relationship between SOC and engine efficiency, as a function of vehicle speed (in kilometers per hour or kph). Alternatively, the relationship between SOC and engine efficiency may be expressed as a function of engine operating point, or BMEP.

The controller 10 executes an algorithm to implement the charging control strategy utilizing the calibration shown in FIG. 3. The algorithm is used by the controller 10 to control and manage charging of the HV battery 40 using the MGU 34 and PEB 36 during ongoing vehicle operation. During vehicle operation, battery SOC decreases due to consumption of electrical energy, mainly through the MGU 34 and 12 Volt vehicle battery 38 in this embodiment. As SOC approaches the minimum allowable SOC, engine operating conditions over which battery charging is permissible and enabled are readily met, as shown in FIG. 3. When SOC approaches an upper level for SOC, in this case a Delta-SOC of 6%, the range of engine operating conditions over which battery charging is permissible and thus enabled narrows. In such conditions, the MGU 34 is unable to charge the HV battery 40, and the HV battery discharges during ongoing operation. Therefore, HV SOC is bounded within a relatively narrow band.

Referring again to the hybrid propulsion system for the vehicle described in FIG. 1, wherein the exemplary internal combustion engine has the operating characteristics described with reference to FIG. 2, and the engine efficiency and SOC limitations of FIG. 3, system operation is now described. The internal combustion engine 20 provides charging torque to the charging system 34, which supplies electrical energy to the HV battery 40 and propulsion torque to the vehicle driveline. The algorithm executed in the controller 10 determines state-of-charge of the electrical energy storage system, as above, and determines operating efficiency of the internal combustion engine, in terms of a normalized value of brake-specific fuel consumption. The operation of the charging system 34 is controlled based upon the state-of-charge of the electrical energy storage system and, the operating efficiency of the internal combustion engine, as is defined by an internal calibration which is developed based upon battery SOC and engine efficiency data, as contained in FIG. 3. As shown, the control system determines vehicle speed, and controls operation of the charging system. Alternatively, the control system determines engine operating point, typically based upon engine speed and load, as measured by the controller using various engine sensors. The electrical charging system is controlled based upon the state-of-charge of the electrical energy storage system, the operating efficiency of the internal combustion engine, and, the engine operating point. In operation, the control system selectively operates the electrical charging system under conditions when a change in the operating efficiency due to operation of the electrical charging system exceeds a predetermined value. Referring again to FIG. 2, showing the engine operating at 1600 RPM and various levels of BMEP, a skilled practitioner is able to calibrate the control algorithm in a manner that causes charging to occur when change in BSFC due to charging is as described with reference to points A and B, i.e., low to medium load engine operation, but discontinues charging when change in BSFC due to charging is as described with reference to points C and D, i.e., medium to high load engine operation. A skilled practitioner is able to select a threshold change in BSFC that optimizes electrical charging and engine fuel consumption.

Referring again to FIG. 3, the control system increases range of engine operation at which the electrical charging system operates based upon a decrease in the battery state-of-charge, i.e. as the battery SOC approaches a minimum acceptable SOC, in this example SOC=70%. Under these conditions, the allowable range of engine efficiencies over which electrical charging is permitted and enabled increases, based upon the engine speed or the engine operating point. The control system is similarly able to limit range of engine operation at which the electrical charging system operates based upon an increase in the state-of-charge. Specifically, as the battery SOC approaches a maximum allowable SOC, in this example SOC=76%, the allowable range of engine efficiencies over which electrical charging is permitted decreases, based upon the engine speed or the engine operating point. Above the maximum allowable SOC, the control system discontinues operation of the electrical charging system. In so operating, the control system maintains the state-of-charge of the electrical energy storage system between the minimum acceptable SOC value and the maximum allowable SOC. By thus maintaining SOC of the electrical energy storage system between the minimum acceptable SOC value and the maximum allowable SOC, the useful life of the high voltage electrical energy storage system 40 is enhanced and optimized.

Therefore, controller 10 controls and manages charging of the HV battery 40 using the MGU 34 and PEB 36 during ongoing vehicle operation, such that operation of the charging system is controlled to bias charging of the energy storage system during periods of engine operation whereat charging induced increases in engine loads result in relatively greater operating efficiency of the internal combustion engine. Furthermore, when the HV battery 40 is at relatively high energy storage system states of charge, charging of the energy storage system is limited during periods of engine operation whereat operating efficiency of the internal combustion engine is relatively low.

The invention has been described with specific reference to the preferred embodiments and modifications thereto. Further modifications and alterations may occur to others upon reading and understanding the specification, including application of the invention to various hybrid architectures other than the belt-driven alternator/starter ('BAS') system described hereinabove. It is intended to include all such modifications and alterations insofar as they come within the scope of the invention.

Having thus described the invention, it is claimed:

1. Control system for a charging system operable to supply electrical energy to an electrical energy storage system of a vehicle having a hybrid propulsion system including an internal combustion engine, operable to provide propulsion torque to a driveline of the vehicle, and operable to provide charging torque to the charging system, comprising: the control system, operable to:
   determine a state-of-charge of the electrical energy storage system;
   determine operating efficiency of the internal combustion engine; and,
   control operation of the charging system, based upon: the state-of-charge of the electrical energy storage system, and, the operating efficiency of the internal combustion engine.

2. The system of claim 1, further comprising the control system operable to: determine speed of the vehicle; and,
   control operation of the charging system, based upon: the state-of-charge of the electrical energy storage system, the operating efficiency of the internal combustion engine, and, the speed of the vehicle.

3. The system of claim 1, further comprising the control system operable to: determine an operating point of the internal combustion engine; and,
   control operation of the electrical charging system, based upon: the state-of-charge of the electrical energy storage system, the operating efficiency of the internal combustion engine, and, the engine operating point.

4. The system of claim 3, wherein the control system operable to control operation of the electrical charging system based upon the operating efficiency of the internal combustion engine comprises: the control system operable to selectively operate the electrical charging system when a change in the operating efficiency due to operation of the electrical charging system exceeds a predetermined value.

5. The system of claim 3, wherein the control system operable to control operation of the electrical charging system based upon the state-of-charge of the electrical energy storage system comprises: the control system operable to increase range of engine operation at which the electrical charging system operates based upon a decrease in the state-of-charge.

6. The system of claim 5, further comprising the control system operable to limit range of engine operation at which the electrical charging system operates based upon an increase in the state-of-charge.

7. The system of claim 6, further comprising the control system operable to discontinue operation of the electrical charging system when the state-of-charge exceeds a maximum value.

8. The system of claim 1, wherein the electrical charging system comprises a high voltage electrical energy charging system.

9. The system of claim 1, wherein the control system operable to control operation of the charging system comprises: the charging system operable to transform kinetic energy of the internal combustion engine into potential electrical energy based upon a control signal from the control system.

10. The system of claim 1, wherein the control system operable to control operation of the charging system, based upon the state-of-charge of the electrical energy storage system comprises: the control system operable to maintain the state-of-charge of the electrical energy storage system between predetermined limits.

11. The system of claim 1, wherein the control system operable to determine operating efficiency of the internal combustion engine comprises: the control system operable to determine a specific fuel consumption of the engine.

12. Method to control operation of a charging system for an electrical energy storage system of a vehicle having a hybrid propulsion system comprising: an internal combustion engine, and, an electric generator operably coupled to the engine and having an electrical output to an electrical energy storage system, comprising:
    determining a state-of-charge of the electrical energy storage system;
    determining operating efficiency of the internal combustion engine; and,
    controlling operation of the charging system, based upon: the state-of-charge of the electrical energy storage system, and, the operating efficiency of the internal combustion engine.

13. The method of claim 12, comprising:
    determining speed of the vehicle; and,
    controlling operation of the charging system, based upon: the state-of-charge of the electrical energy storage system, the operating efficiency of the internal combustion engine, and, the speed of the vehicle.

14. The method of claim 12, comprising:
    determining an operating point of the internal combustion engine; and,
    controlling operation of the electrical charging system, based upon: the state-of-charge of the electrical energy storage system, the operating efficiency of the internal combustion engine, and, the engine operating point.

15. The method of claim 14, wherein controlling operation of the electrical charging system, based upon the operating efficiency of the internal combustion engine comprises: selectively operating the electrical charging system when a change in the operating efficiency due to operation of the electrical charging system exceeds a predetermined value.

16. Method to optimize life of an electrical energy storage system, comprising:
    determining a state-of-charge of the electrical energy storage system;
    determining operating efficiency of the internal combustion engine;
    determining an operating point of the internal combustion engine;

controlling operation of the electrical charging system, based upon: the state-of-charge of the electrical energy storage system, the operating efficiency of the internal combustion engine, and, the engine operating point;

selectively operating the electrical charging system when a change in the operating efficiency due to operation of the electrical charging system exceeds a predetermined value;

increasing range of engine operation at which the electrical charging system operates, based upon a decrease in the state-of-charge;

limiting range of engine operation at which the electrical charging system operates, based upon an increase in the state-of-charge, and, discontinuing operation of the electrical charging system when the state-of-charge exceeds a maximum value.

17. The method of claim 16, wherein the electrical energy storage system comprises a vehicle having a hybrid propulsion system including an internal combustion engine, and, an electric generator operably coupled to the engine and having an electrical output to the electrical energy storage system.

18. Method to control operation of a charging system for an electrical energy storage system of a vehicle having a hybrid propulsion system including an internal combustion engine and an electric generator operably coupled to the engine and having an electrical output to an electrical energy storage system, comprising:

controlling operation of the charging system to bias charging of the energy storage system during periods of engine operation whereat charging induced increases in engine loads result in relatively greater operating efficiency of the internal combustion engine.

19. The method to control operation of a charging system for an electrical energy storage system of a vehicle as claimed in claim 18, further comprising:

at relatively high energy storage system states of charge, limiting energy storage system charging to periods of engine operation whereat operating efficiency of the internal combustion engine is relatively low.

* * * * *